Figure 1:
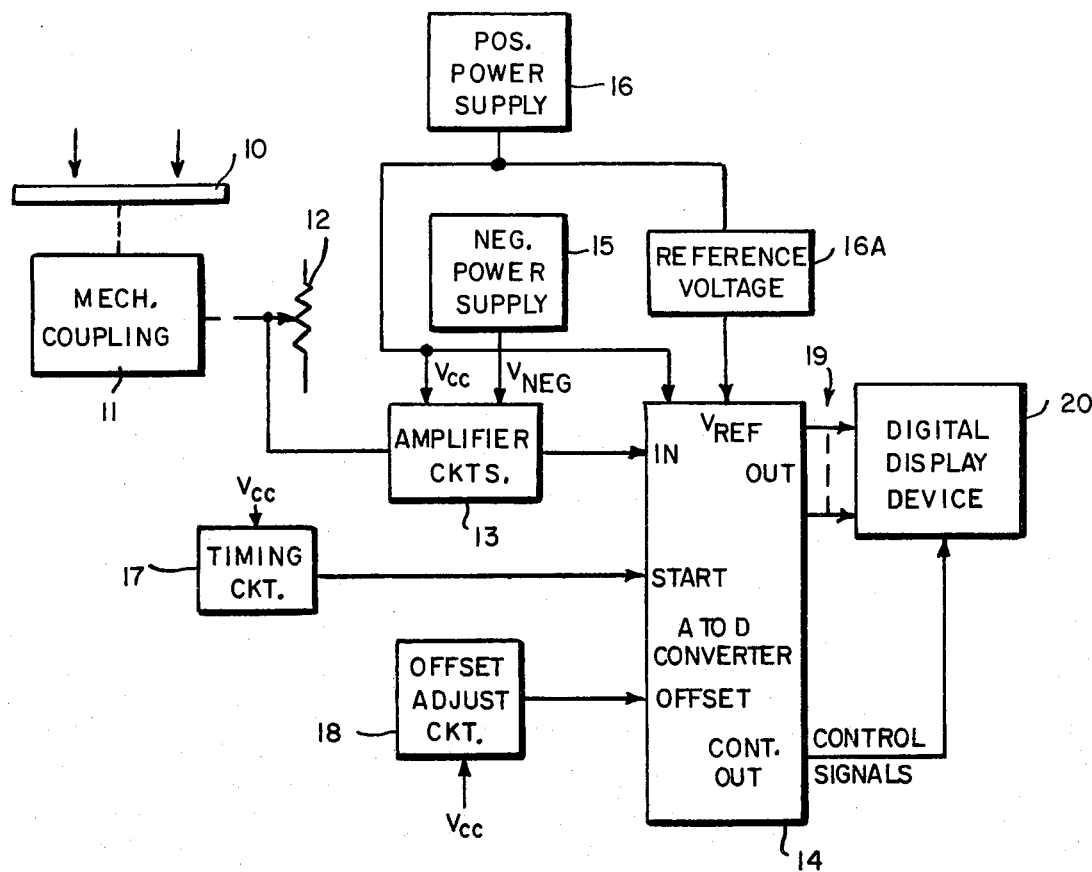

United States Patent [19]

Mavretic

[11] 4,350,216

[45] Sep. 21, 1982

[54] WEIGHING DEVICES USING ELECTRONIC CIRCUITRY

[75] Inventor: Anton Mavretic, Natick, Mass.

[73] Assignee: Avitar, Inc., Rumford, R.I.

[21] Appl. No.: 186,315

[22] Filed: Sep. 11, 1980

[51] Int. Cl.³ .......................... G01G 23/14; G01G 3/14
[52] U.S. Cl. ..................................... 177/164; 177/211; 177/DIG. 3
[58] Field of Search ................. 177/164, 165, DIG. 3, 177/211

[56] References Cited

U.S. PATENT DOCUMENTS

| | | | |
|---|---|---|---|
| 3,797,595 | 3/1974 | Yin et al. | 177/164 |
| 4,044,846 | 8/1977 | Matilainen | 177/165 |
| 4,137,979 | 2/1979 | Itani | 177/DIG. 3 |
| 4,155,411 | 5/1979 | Weaver | 177/DIG. 3 |
| 4,294,322 | 10/1981 | Nishiyama | 177/211 X |

FOREIGN PATENT DOCUMENTS

| | | | |
|---|---|---|---|
| 52-20064 | 2/1977 | Japan | 177/164 |
| 52-24561 | 2/1977 | Japan | 177/164 |

Primary Examiner—George H. Miller, Jr.
Attorney, Agent, or Firm—Robert F. O'Connell

[57] ABSTRACT

A bathroom scale which uses an electronic circuit for providing a digital output voltage in response to the placing of a weight thereon, the electronic circuit having operational amplifier circuits which use both a positive power supply and a negative power supply, the latter assuring that the op-amps always return to a stabilized ground reference point to assure repeatability of weight measurement. The unit includes means for permitting the digital output voltage to reach a steady state value during a selected time period after a weight is placed on the scale and for preventing such steady state value from changing after such selected time period. The gain of the op-amp circuitry is adjustable to permit scale calibration to be performed.

11 Claims, 2 Drawing Figures

WEIGHING DEVICES USING ELECTRONIC CIRCUITRY

INTRODUCTION

This invention relates generally to weighing devices and, more particularly, to weighing devices which use electronic circuitry for producing an output signal, for suitable display, which signal is representative of the weight placed on the device.

SUMMARY OF THE INVENTION

Weighing devices which have recently been available, particularly those used in the home for weighing persons and generally referred to in the trade as bathroom scales, have utilized electronic circuitry techniques for determining and displaying the weights involved. The accuracy and reliability of such devices can be adversely affected by the use of circuitry in which critical voltage levels therein tend to be unstable so that the circuit does not always operate to provide accurate and repetitive representations of the true weights involved.

BRIEF SUMMARY OF THE INVENTION

In accordance with the invention, an electronic circuit has been devised for use in weighing devices, which circuit provides stable voltage levels, both in analog and digital form, so that the weight which is displayed, as by digital display circuitry, for example, is a true and repeatable representation of the actual weight placed on the platform of the device. The circuit includes both positive and negative power supplies for the operational amplifiers of the analog portion thereof so that the voltages involved always return to the same reference level (effectively "ground" reference) to assure accuracy of weight measurement and accuracy in calibration of the device. The circuitry further utilizes independent ground buses for the analog and digital circuit portions thereof which, in effect, isolate the grounds used in each circuit portion. Moreover, the circuit provides for the isolation of the effects of battery drain when multiple battery power sources are used, which isolation extends battery life.

DESCRIPTION OF THE INVENTION

Figure 2:
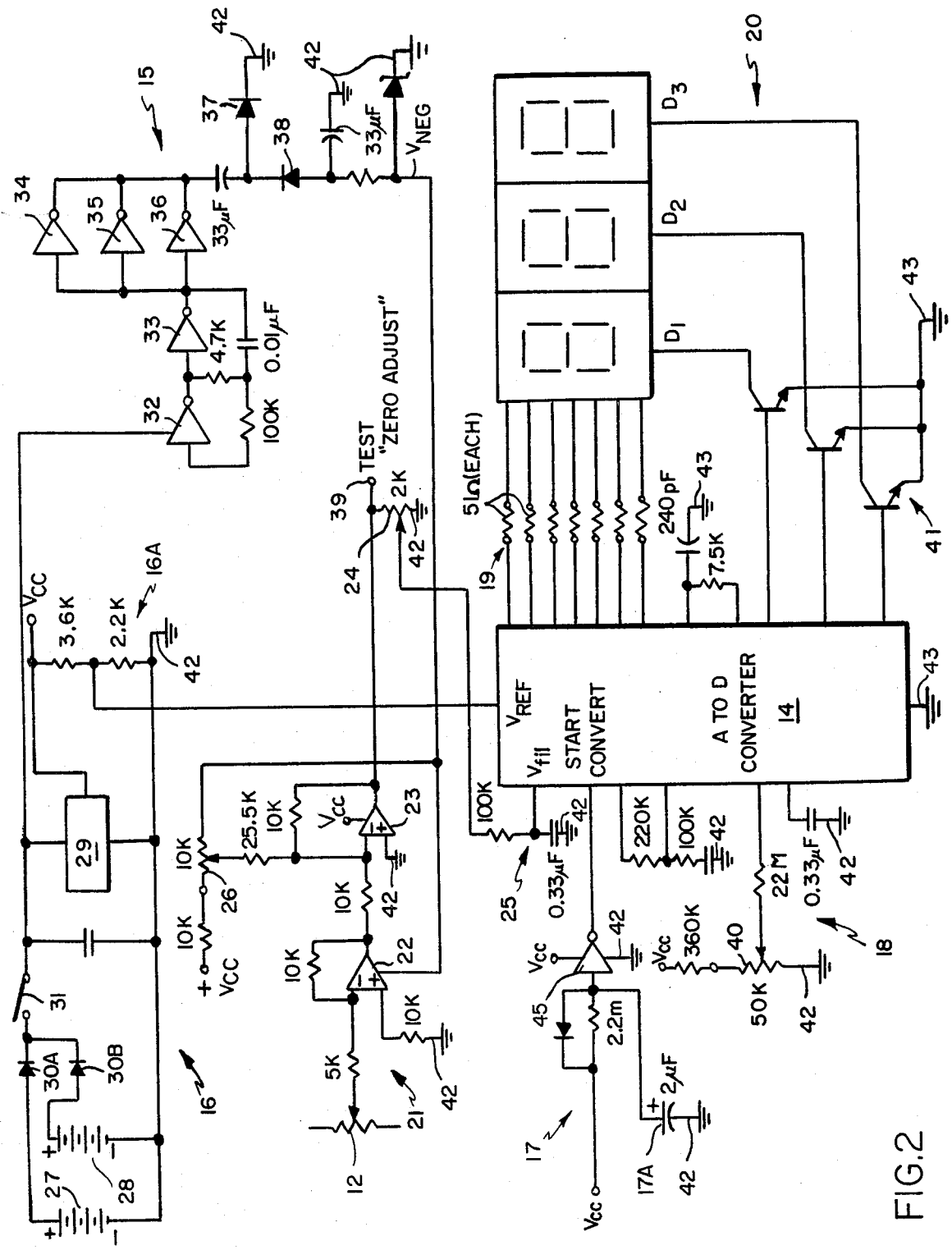

The invention can be described in more detail with the help of the accompanying drawing wherein:

FIG. 1 represents a block diagram of an electronic circuit which provides for the display of the output of a weighing device; and FIG. 2 represents a more detailed circuit diagram of the electronic circuitry used in the system of FIG. 1.

As can be seen in FIG. 1, a scale has a platform 10 which is depressed when an object, such as a person, is placed thereon, as shown in diagrammatic form in the drawing. The movement of platform 10 is mechanically coupled via suitable mechanical coupling components 11 to the moving arm of a potentiometer 12, for example, so as to provide an output voltage, the amplitude of which is representative of the displacement of the scale platform and, hence, of the weight of the object placed thereon. The scale mechanisms for providing such output voltage are shown only in simplified diagrammatic form inasmuch as exemplary structures and the operations thereof would be well known to those in the art. One such exemplary structure, for example, is depicted in U.S. Pat. No. 3,469,645, issued to M. A. Provi et al. on Sept. 30, 1969. This invention makes use of such a voltage signal in a unique manner as shown by the block diagram of the circuitry of FIG. 1, a more specific circuit diagram thereof being shown in FIG. 2.

As can be seen in FIG. 1, the analog output voltage from the movable wiper arm of potentiometer 12 is supplied to amplifier circuitry 13 so as to produce an amplified analog signal which is supplied to the input of an analog-to-digital converter circuit 14. It is desirable, however, that in order to provide accuracy in calibration and operation thereof, the circuit ground return always remains at substantially the same ground reference level. To achieve such operation the circuit of the invention uses a unique negative power supply circuit 15 to provide a negative reference voltage $V_{NEG}$ which is suitably set so as to provide for such operation, as described more fully below with reference to FIG. 2. A positive power supply circuit 16 is used, as is conventional, to provide the required positive power supply voltage $V_{CC}$ (nominally +5 volts) for the operational amplifiers.

Positive power supply 16 also supplies another suitable positive reference voltage $V_{REF}$ (nominally 2.0 volts) at reference voltage source 16A for analog-to-digital (A-to-D) converter 14. The timing circuit 17 is used to disable the operation of the A-to-D converter for a suitable delay time period once the weight has been determined and displayed so that the steady state value is maintained and subsequent transient motions of the scale (as by minor movements of the person on the scale) do not affect the display reading.

An offset adjust circuit 18 is used to set the output of the A-to-D converter to zero when the input voltage from amplifier circuit 13 is effectively at a zero level (i.e., no depression of platform 10 occurs).

The digital output signal, at line 19, from A-to-D converter 14, is supplied to a suitable digital display device 20, the display thereof being appropriately controlled by control signals from converter 14, as shown, to provide for a multiple digit display of the weight which has been placed on scale platform 10.

An exemplary embodiment of the circuitry shown in FIG. 1 is depicted in FIG. 2 in more detail. As can be seen therein, the analog voltage signal from potentiometer 12 is supplied via input network 21 to a first operational amplifier (OP-AMP) 22 which is in cascade with a second operational amplifier 23. Exemplary OP-AMPs 22 and 23 are available from National Semiconductor Corporation, Santa Clara, California under Model designation LM324, such model comprising an integrated circuit chip which includes four OP-AMPs, two of which are used as shown.

The output analog signal from OP-AMP 23 is supplied to a variable potentiometer 24. The output of the variable wiper arm of potentiometer 24 is supplied via an input R-C circuit 25 to the input pin (identified as $V_{fil}$) of an analog-to-digital converter circuit 14. A-to-D converter 14 may be an integrated circuit chip such as is available, for example, from National Semiconductor Company of Santa Clara, California under the Model designation ADD3701.

A positive power supply circuit 16, as described below, provides positive reference voltage $V_{CC}$ (nominally 5 volts) to the OP-AMPs via variable resistor 26. A positive reference voltage $V_{REF}$ is supplied to the A-to-D converter as shown.

Positive power supply 16 includes a pair of 9-volt batteries 27 and 28, the voltages thereof being supplied to a voltage regulator 29, such as is available in integrated circuit form from National Semiconductor Corporation of Santa Clara, California under the model designation LM7805, via a pair of diodes 30A and 30B and step-on switch 31. The presence of diodes 30A and 30B isolates the operation of the batteries from each other so that one battery cannot act as a load on the other to drain the other battery unwarrantedly when the switch is off. Switch 31 is, for example, a microswitch arranged to be activated when the scale platform is depressed, such activation thereby putting the overall circuitry of FIG. 2 into operation.

Because the OP-AMPs 22 and 23, even when shunted to ground, tend to float randomly at an uncontrollable voltage level slightly above ground (in the range of about 0.64 volts, for example), such operation would tend to prevent the scale from providing a repeatable, accurate reading and would also tend to prevent the scale from being accurately calibrated. In order to assure that the OP-AMPs always return to a stable reference level, a negative power supply circuit 15 is utilized for supplying a stable negative reference voltage, indicated in the figures as $V_{NEG}$.

As can be seen therein, a plurality of inverter circuits are arranged as shown with two inverters 32 and 33 in series with a parallel arrangement of inverters 34, 35 and 36. The output of the parallel inverters is capacitively coupled to a network of back-to-back diodes 37 and 38, $V_{NEG}$ being obtained at diode 38 and supplied to the control input of OP-AMP 22. Such circuitry produces a stable negative power supply voltage which effectively stabilizes the reference level of the OP-AMP circuitry as desired. The inverter circuits may be of the type available from Radio Corporation of America at Camden, New Jersey under the Model designation CD4049, as integrated circuit chip comprising six such logic circuits, five of which can be used in negative power supply 15 and one of which can be used as the inverter circuit of timing circuit 17, discussed below. Diodes 37 and 38 may be standard diodes sold by many manufacturers under the designation 1N4001.

If a voltmeter (providing for readings in the microvolt range) is used at TEST ZERO ADJUST point 39, the zero adjust potentiometer 26 at the output of OP-AMP 23 is adjusted, when no weight is placed on the scale platform 10, so as to produce a zero reading on the voltmeter, which setting, because the negative voltage $V_{NEG}$ remains stable and returns the OP-AMP circuit to a stable reference value, maintains a stable zero reading during operation.

Because transient mechanical motions often occur while a person is standing on scale platform 10 after the weight reading has been displayed, it is desirable to prevent such motions from changing the steady state digital output reading once such reading has been obtained. For this purpose, a timing circuit 17 is used, the output of which is high when switch 31 is activated by depression of the scale platform. Such output remains high and permits the A-to-D converter to operate (so as to provide the desired reading) until the capacitance 17A discharges and the output from the inverter amplifier 45 goes low, the A-to-D converter then being disabled and prevented from operating. The R-C time constant of the circuit 17 can be set, for example, so as to provide a time delay of 2.0 seconds.

Since the A-to-D converter chip itself is such as to provide a small digital output even when the analog input signal thereto is zero, an offset adjust circuit 18 is utilized to adjust for such chip characteristics. Adjustment of potentiometer 40 provides for the desired offset setting so that the scale reading is zero when the input at $V_{fil}$ is zero.

The variable potentiometer 26 is adjusted, as discussed above, to control the offset of OP-AMP circuitry 21, 22 and 23. When a known weight of any suitable value, e.g., 100 pounds, is placed on scale platform 10, potentiometer 24 is adjusted until the digital display circuitry 20 displays a reading of 100.

The output of the A-to-D converter is supplied to a digital display device 20 which may be, for example, a digital display circuit made and sold by National Semiconductor Corporation of Santa Clara, California under the Model designation NSB5003. The coded output on lines 19 (e.g., a 7 bit parallel coded output) representing the numeric symbols to be displayed is supplied to the display device while the multiplexed output control signals are supplied via transistor circuitry 41 (using, for example, transistors having the same Model No. 2N2222 as made by many manufacturers) to the display character portions as shown and as would be well known to those in the art.

In order to provide for a more effective noise-free operation of the overall system, the ground reference points of the analog circuitry are all tied together and are isolated from the ground reference points for the digital signal outputs of the A-to-D converter. Thus, ground references 42 represent the analog ground points which are all tied to a first common ground point, or bus, while ground references 43 represent the digital ground points which are all tied to a second common ground point, or bus, which is effectively isolated from the first common ground.

Thus, the circuitry of FIGS. 1 and 2 provides for the appropriate processing of the electrical signal available when a weight has been placed on a scale platform 10 so that the digital display of the weight is both accurate and reliable. Further, the processing circuitry itself does not introduce any adverse effects and the overall operation can be readily calibrated to provide for a high degree of linearity.

What is claimed is:

1. A weighing device comprising
movable platform means for accepting a weight placed thereon;
means for providing an analog voltage;
means for mechanically coupling said movable platform means and said analog voltage providing means to produce an analog voltage therefrom which is proportional to the displacement of said platform means;
electric circuit means responsive to said analog voltage for providing a corresponding digital voltage representation thereof, said circuit means including
means for amplifying said analog voltage to produce an amplified analog voltage;
analog-to-digital converter means responsive to said amplified analog voltage to produce said digital voltage;
first power supply means for providing a fixed positive reference voltage for said amplifying means;
second power supply means for providing a fixed negative reference voltage for said amplifying means;

first variable adjusting means for adjusting the digital voltage output from said analog-to-digital converter means to zero when no weight has been placed on said movable platform means.

2. A weighing device in accordance with claim 1 wherein said second negative power supply means includes a plurality of inverter logic circuits connected in series, first diode means capacitively coupled to the output of said series inverter circuits to provide said negative reference voltage for said amplifying means, and a second diode means connected from the capacitively coupled output from said series inverter circuit to a ground reference point.

3. A weighing device in accordance with claim 2 wherein said series inverter logic circuits comprise three series connected inverter logic circuits, one of said logic circuits having one or more additional inverter logic circuits connected in parallel with it.

4. A weighing device in accordance with claims 1 or 2 wherein said first power supply means includes
a pair of DC voltage sources;
diode means in series with each said source to isolate said sources from each other.

5. A weighing device in accordance with claim 4 wherein said DC voltage sources are batteries and said diode means prevent each battery from acting as a current drain with respect to the other battery.

6. A weighing device in accordance with claims 1 or 2 and further including offset adjusting circuit means for adjusting the digital voltage output from said analog-to-digital converter circuit to zero when the input to said analog-to-digital circuit is zero.

7. A weighing device in accordance with claims 1 or 2 wherein
said amplifying means includes one or more interconnected reference points which are connected to a first ground reference point and
said analog-to-digital converter means includes an output circuit having one or more interconnected reference points which are connected to a second ground reference point which is independent of said first ground reference point.

8. A weighing device in accordance with claims 1 or 2 and further including
timing circuit means operative when said electric circuit means is placed into operation to permit the operation of said analog to digital converter means for a selected time period after a weight is placed on said movable platform means and to prevent the operation of said analog-to-digital converter means thereafter.

9. A weighing device in accordance with claim 8 wherein said selected time period is about 2.0 seconds.

10. A weighing device in accordance with claims 1 or 2 and further including variable means connected between said amplifying means and the input of said analog-to-digital converter for adjusting the amount of the gain of said amplifying means which is supplied to said analog-to-digital converter.

11. A weighing device in accordance with claim 10 wherein said variable means can be adjusted to provide a selected gain such that when a known weight is placed on said movable platform the digital output voltage is set to a known level which represents said known weight.

* * * * *